No. 826. REISSUED SEPT. 27, 1859.
E. SAVAGE.
MACHINE FOR THREADING SCREW BLANKS.
2 SHEETS—SHEET 1.
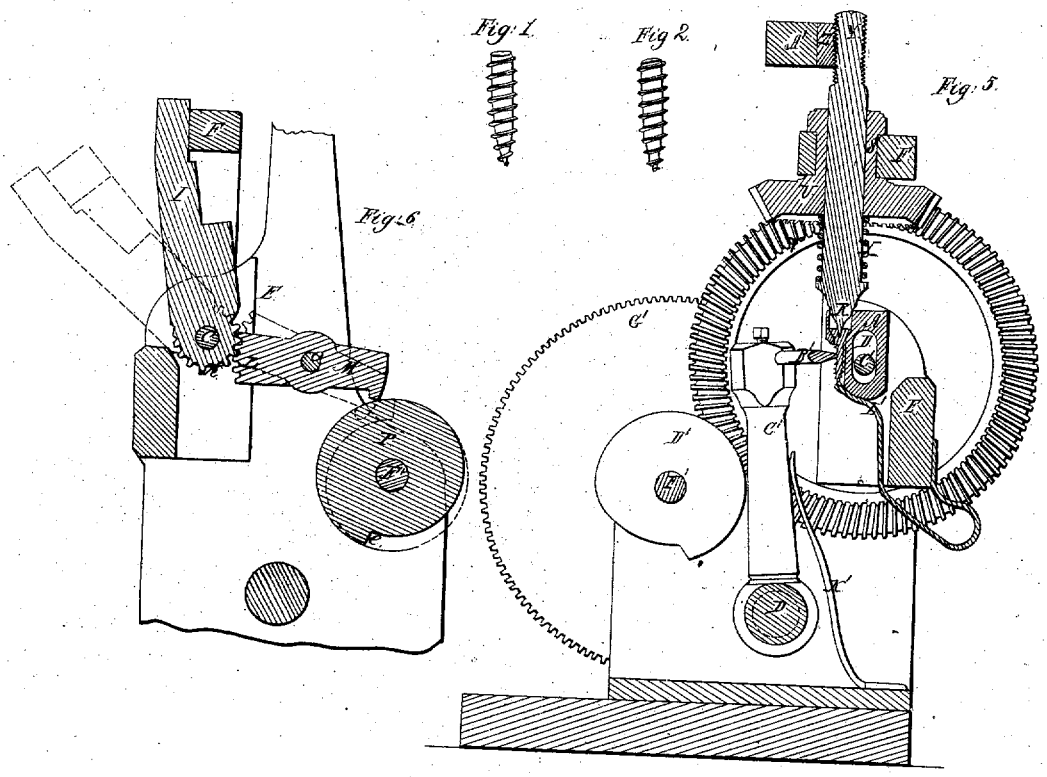
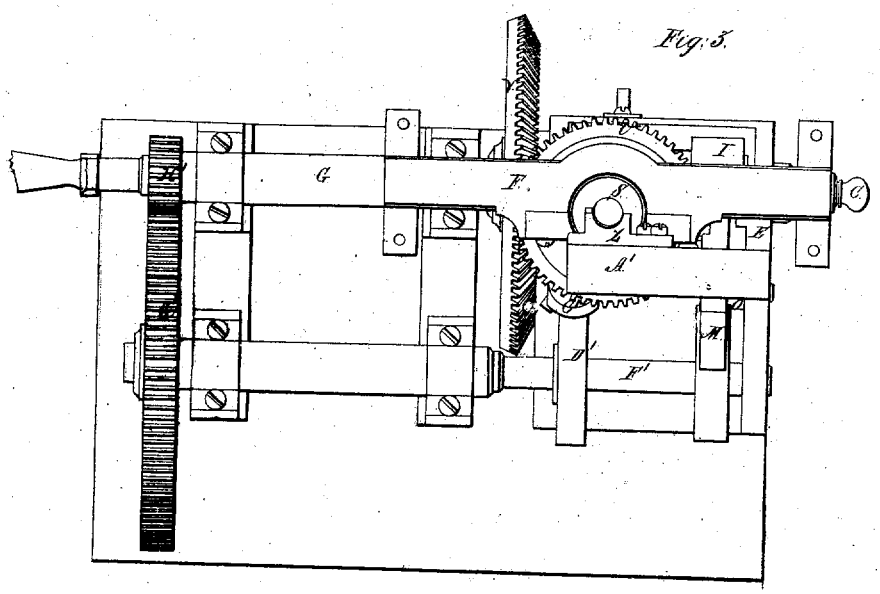

No. 826. REISSUED SEPT. 27, 1859.

E. SAVAGE.

MACHINE FOR THREADING SCREW BLANKS.

2 SHEETS—SHEET 2.

UNITED STATES PATENT OFFICE.

ELLIOT SAVAGE, OF BERLIN, CONNECTICUT, ASSIGNOR TO HIMSELF, AND C. PARKER, OF MERIDEN, CONNECTICUT.

MACHINE FOR THREADING SCREW-BLANKS.

Specification forming part of Letters Patent No. 11,974, dated November 21, 1854; Reissued September 27, 1859, No. 826.

*To all whom it may concern:*

Be it known that I, ELLIOT SAVAGE, of Berlin, Hartford county, Connecticut, have invented certain new and useful Improvements in Threading Screw-Blanks; and I do hereby declare that the following is a full, clear, and exact specification thereof, reference being had to the annexed drawings, which are fully described herein and in which similar letters indicate similar parts throughout the figures.

My invention consists in an improvement in the method of threading wood-screws whereby I am enabled to produce screws of superior form and workmanship.

The principal feature of my said improvement lies in the manner of applying the threading tool or chaser to the screw blank.

The improved shape consists in the manner of forming the penetrating end of the blank so as to produce a true gimlet pointed screw, and by the method which I have devised any desired degree of taper may be given to the core at the said terminating end.

In the old threading machines "the chaser" was made to move along the blank in a direction parallel to the axis of rotation of said blank while cutting the cylindrical portion of the screw, and if a taper was to be given to the pointer entering end the chaser was at that part made to move also toward said axis, thus merely turning down the core at that part and leaving the bounding lines of the entire core parallel throughout the whole length of the threaded part of the screw.

Figure 4:
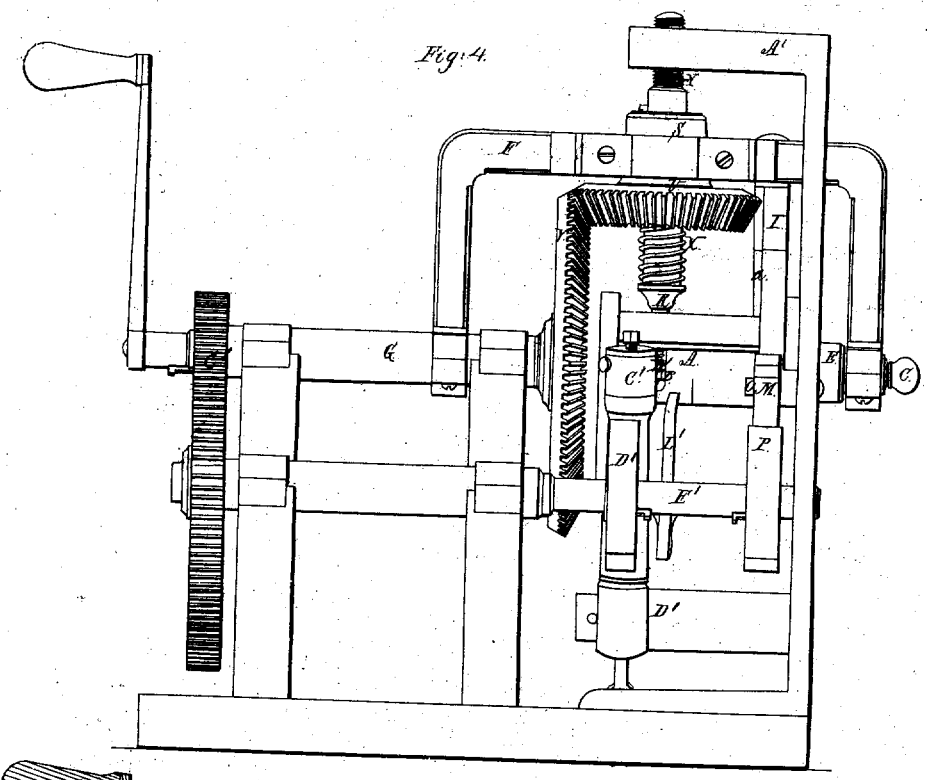
Figure 7:
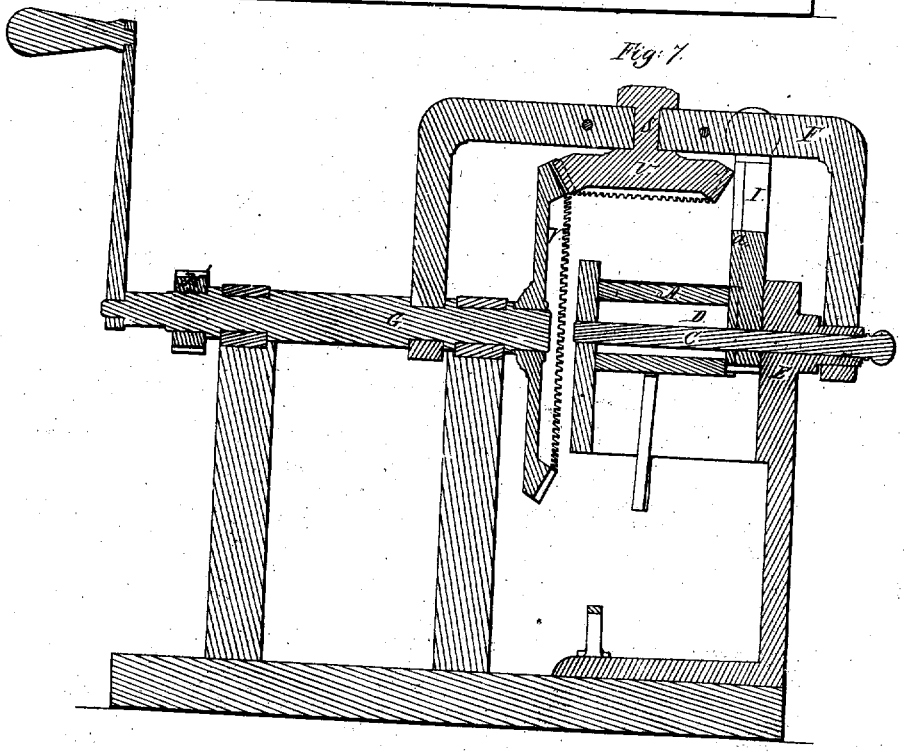

The machinery which I have thus invented for the purpose is thus described,

Figure 1, of the drawings exhibits a side view of the pointed end of a screw blank cut in my improved manner. Fig. 2, is a similar view of one formed in the common way. Fig. 3, is a top view of my machine. Fig. 4, is a front elevation thereof. Fig. 5, is a transverse vertical section taken through the screw driver, exhibiting the tool-post and its cam. Fig. 6, is a like section of the machine taken through the cam and mechanism by which the screw rest or carriage is turned while the point or entering end of the blank is being cut and threaded. Fig. 7, is a longitudinal vertical section taken through the middle of the screw rest or carriage.

In the drawings, A, indicates the screw rest or carriage, which holds the screw blank B, during the operation of threading it. The socket or place for the reception of the screw-blank is formed in the front of the said carriage or rest, as shown in Fig. 5, at the side of and at a short distance from the axis thereof. This axis, during the formation of the pointed end of the screw blank, corresponds with that of the horizontal pin or shaft C, on which the screw holder is placed, the said pin passing through the screw holder in an opening D, formed through the same, such passage being shaped in vertical and transverse section, as seen in Fig. 5.

The pin C, is supported by the frame work E, and constitutes a journal for a yoke or frame F to turn upon, the frame being also supported and made to turn upon a driving shaft G, placed in range of the said pin. There is a lever I, disposed upon the shaft C and made to turn thereon, the lower end of which lever is formed with a semi-circle or arc of cogs or teeth, as seen at K and made to engage with the teeth L, of the lever M, which turns upon a fulcrum O and rests against and is operated by the cam P. The upper end of the lever I abuts against the rear side of the yoke, and on the inner side of the said lever there is formed a projecting rail or slide ($a$) on which the screw blank carriage moves, and by which it is guided in a vertical direction when it is made to descend during the operation of making the thread on the cylindrical part of the screw-blank.

There is applied to the carriage a screw driver R, sliding freely up and down through the tubular shaft S which is supported by and made to rotate in the yoke, and is put in rotation by two bevel gears U, V, one of which is fixed on the shaft S and the other on the driving shaft.

The screw driver should be applied to the tubular shaft S by such connection as will permit to be moved longitudinally through the same, and cause it to be rotated by said tubular shaft. The screw driver is forced down into the nick or groove in the head of the screw-blank by means of a spring ($x$) and it has a screw ($y$) formed upon its upper end, the pitch of the thread of such screw being made to correspond with that to be formed on the screw blank. This screw operates in connection with a semi female screw Z, fixed upon the arm A′ extending upward from the main frame.

The screw chaser or cutter is shown at B′ as affixed to the upper end of a tool-post or turning lever C′ which turns on the fulcrum D, and is moved to and from the screw blank rest or carriage. The movement of the said tool post or lever toward the carriage is effected by the action of the cam D′ fixed upon the shaft F′ receiving motion from the main driving shaft by gearing, as seen at G′ and H′. The backward movement of the tool post is produced by a spring K′. There is another spring L′ applied to the main frame work and made to press against the underside of the screw blank carriage, being for the purpose of elevating the said carriage after it has been depressed by the screw driver.

In the operation of threading a screw-blank by this method the blank is to be put into place in the carriage A, when that is inclined in the position shown in Fig. 6, by the dotted lines. The main shaft being now in motion the chasing tool will be brought up against the lower extremity of the screw blank at its axis of rotation.

The blank is in rotation by means of the screw driver R.

The carriage A now begins to turn upon its axis C by the action of the cam P, and while thus turning the thread is being cut upon the point of the blank and the core receives the desired shape since the chasing tool will at this time be directed toward the axis C, whatever the position of the blank may be.

When the carriage has been turned up sufficiently to give to the point the proper form, the upper end of the screw driver is to enter the female screw Z. The action of this forces the driver down and with it the carriage and screw blank, thus continuing the thread along the cylindrical part of the blank and completing the screw. The chasing tool was presented, while threading the body of the blank, at a right angle to the axis of rotation of said blank and it would necessarily retain that position since after the driver enters Z, the carriage A, is not turned any farther upon C, but is made to move or slide downward against it, thereby giving to the blank at that time a motion in the direction of its axis of rotation, as well as the rotation upon that axis which it has from the driver.

I claim—

The method herein described of causing the chasing tool to act upon the screw blank in producing both the cylindrical part and the tapering point, that is to say, by so governing the relative positions of each to the other that while threading the cylindrical portion the chasing tool shall be presented at a right angle to the axis of rotation of the blank, and while cutting the tapering part shall be so inclined acutely to said axis that the line of travel of the face of the chaser shall finally intersect said axis substantially as set forth.

In witness whereof I have hereunto set my hand.

ELLIOT SAVAGE.

Witnesses:
I. P. Pirsson,
S. H. Maynard.

[First printed 1911.]